United States Patent
Eker et al.

(10) Patent No.: US 8,296,535 B2
(45) Date of Patent: Oct. 23, 2012

(54) GENERATING INCREMENTAL PROGRAM UPDATES

(75) Inventors: Johan Eker, Lund (SE); Carl Von Platen, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 543 days.

(21) Appl. No.: 12/096,358

(22) PCT Filed: Dec. 6, 2006

(86) PCT No.: PCT/EP2006/011706
§ 371 (c)(1), (2), (4) Date: Sep. 25, 2008

(87) PCT Pub. No.: WO2007/071324
PCT Pub. Date: Jun. 28, 2007

(65) Prior Publication Data
US 2009/0070374 A1   Mar. 12, 2009

Related U.S. Application Data

(60) Provisional application No. 60/752,040, filed on Dec. 21, 2005.

(30) Foreign Application Priority Data
Dec. 20, 2005 (EP) .................................. 05388112

(51) Int. Cl.
*G06F 13/00* (2006.01)

(52) U.S. Cl. ....................................................... 711/162

(58) Field of Classification Search .................. None
See application file for complete search history.

(56) References Cited

U.S. PATENT DOCUMENTS

| | | | |
|---|---|---|---|
| 6,230,316 B1 | 5/2001 | Nachenberg | |
| 6,546,552 B1 * | 4/2003 | Peleg | 717/170 |
| 6,578,194 B1 * | 6/2003 | Baumgart et al. | 717/140 |
| 2003/0084434 A1 | 5/2003 | Ren | |
| 2005/0268296 A1 * | 12/2005 | Marolia et al. | 717/168 |

FOREIGN PATENT DOCUMENTS

| | | | |
|---|---|---|---|
| EP | 1 333 375 A | 8/2003 | |
| EP | 1 533 695 A | 5/2005 | |

OTHER PUBLICATIONS

The String to String Correction Problem with Block Moves, Walter F. Tichy, ACM 1984.*

(Continued)

*Primary Examiner* — Duc Doan
(74) *Attorney, Agent, or Firm* — Potomac Patent Group PLLC

(57) ABSTRACT

A method of generating a delta file, the delta file including update instructions for causing a target processing device to transform a current memory image module into an updated memory image module. The method includes: incorporating a parametric representation of a first memory address in the delta file, the parametric representation being parametric with respect to at least one parameter; and incorporating parameter resolution instructions in the delta file, wherein the parameter resolution instructions are adapted to cause the target processing device to determine a value of said at least one parameter and to determine an address value of the first memory address from the parametric representation and the determined value of said at least one parameter.

25 Claims, 6 Drawing Sheets

OTHER PUBLICATIONS

PCT International Preliminary Report on Patentability, mailed Jul. 3, 2008, in connection with International Application No. PCT/EP2006/011706.

PCT International Search Report, mailed Feb. 15, 2007, in connection with International Application No. PCT/EP2006/011706.

Baker, B.S. et al.: "Compressing differences of executable code" Workshop on Compiler Support for System Software and ACM Sigplan, Apr. 22, 1999, pp. 1-10, XP002315222.

Tichy, Walter F.: "The String-to-String Correction Problem with Block Moves" ACM Transactions on Computer Systems 2:4, Nov. 1984, pp. 309-321.

Reichenberger, C.: "Delta Storage for Arbitrary Non-Text Files" Proceedings of the 3rd International Workshop on Software Configuration Management, May 1991, pp. 141-152.

EPO Communication, dated Aug. 13, 2009, in connection with International Application No. 05 38 112.4-2211.

Chinese Office Action, dated Nov. 11, 2010, in connection with Chinese Patent Application No. 200680051361.2.

* cited by examiner

GENERATING INCREMENTAL PROGRAM UPDATES

TECHNICAL FIELD

This invention relates to the updating of memory image modules stored in a storage medium associated with a target processing device. More particularly, the invention relates to the generation of an updated memory image to be loaded into a storage medium, e.g. a memory of a processing device, having stored thereon a current memory image.

BACKGROUND AND DESCRIPTION OF RELATED ART

Many modern electronic devices, e.g. embedded devices, are controlled by software stored in flash memory. Flash memory is a type of memory that is frequently used in electronic devices, because it allows multiple rewrites. However, the write operations are limited to entire memory sectors, so-called pages, at a time. A typical page size of current flash memories is 64 kbyte.

When the software stored in a flash memory of an electronic device is updated, e.g. in order to add new features to the software and/or to correct errors in the current version of the software, some or all of the memory sectors of the flash memory are re-written/re-programmed or "re-flashed". In general, it is desirable to minimize the number of flash pages that are re-written during a software update, in order to minimize the time and energy consumption required for installing the software update.

In particular, an application where update times are of great concern is the over-the-air (OTA) update of mobile terminals, e.g. the update of the firmware of the mobile terminal, a so-called Firmware-Over-The-Air (FOTA) update.

In order to provide resource-efficient update mechanisms, it is known to distribute incremental updates, i.e. to distribute only modifications to the current image to the target device, rather than the entire updated image. The modifications are generally referred to as delta-files. Typically, in such systems, an update agent running on the mobile terminal applies the received modifications to the current image which is thereby transformed to the updated version. It is generally desirable to reduce the size of the delta-files, in order to reduce the required loading/transmission bandwidth when sending the delta file via a communications channel and/or to reduce the processing time as well as storage requirements during the loading process in the target device.

Furthermore, it is generally desirable to reduce the amount of storage capacity and computational resources required in the mobile terminal in order to perform the software update.

It is further a general problem of such update systems that the terminal may not be functional during the update process. Hence, it is desirable to reduce the time required for re-flashing the memory and, thus, the downtime of the system.

For the purpose of the present description, the storage medium may have stored thereon one or more software modules that may be updated simultaneously or individually, e.g. different components of a larger software system and/or different individual software applications. The part of the binary memory content that corresponds to a certain software module will also be referred to as a memory image module.

In known delta update systems, information on how the software modules are placed in memory of the target device is typically available to the delta file generation tool. In particular, the delta file generation tool typically assumes that the start address of the memory image module to be updated is known and fixed, as is the case when the memory image comprises a single fixed image module that is always located at the same start address. However, a particular problem arises when the storage memory contains modules that may be located at different start addresses in the memory of each target device, such that the delta file generation tool does not know the actual start address of that module.

In particular, in such situations the exact binary image of the currently installed software module is not known to the off-line tools that generate the update package, and the images of a single version of a software module on different target devices are likely to be different. Furthermore, the location at which the new image will be loaded is not necessarily the same as that of the installed one, since e.g. space requirements may force the target device to select a different location.

Hence, the binary image of such a software module is completely determined only after being loaded in memory. Typically such modules are received by the target device in a relocatable version, e.g. in object code format that includes symbolic/unresolved references to memory addresses. For the purpose of the present description such modules will also be referred to as load modules. The symbolic references in a load module are resolved by the target device during the load process. Different symbolic references may require different resolutions, e.g. absolute references are resolved differently from relative references. Consequently, a load module has so-called relocation instructions associated with it that instruct the resolution process how to calculate actual memory address for respective symbolic references.

U.S. Pat. No. 6,230,316 discloses a method for incrementally updating files on a desktop computer system. In certain situations, it is not possible or not desirable to load an executable file to its originally intended location. The start address of the executable code is then changed, a process that is called rebasing. Rebasing is done on the target system after the software has been installed on the computer, which makes the exact content of the executable file unknown to the off-line tools that prepare the delta file. In particular, an executable file of a desktop system is typically stored in secondary memory, typically a hard disk, and part of the file is loaded from the secondary memory to a primary memory, typically a Random Access Memory (RAM), before it is executed. The part of the file that is not copied to the primary memory contains relocation information which lists references that are location dependent. The relocation information is utilized when rebasing the file. The relocation information can also be used for reverting the process of rebasing, which results in a canonical form that may be known to the off-line tools. The above prior art method discloses a method that generates a delta file between canonical forms of the current and the updated file, i.e. a form that has been rebased to a predetermined base address. On the target system, the installed version is brought in the same canonical form before the delta file is applied and the updated version is generated which may subsequently be rebased to a new base address.

Even though the above prior art method provides a method for incrementally updating rebased files on a desktop computer system, it remains a problem to provide an incremental update system that solves the above general problem and is suitable for portable devices controlled by embedded software, such as mobile terminals.

In particular, in contrast to a desktop system, a binary image used in an embedded system is usually executed "in place", i.e. it is stored in persistent memory and executed from the same memory. Application of the above prior art method to an embedded system would require the relocation information to be stored in the target device in addition to the executable code. However, the size of the relocation information may be significant, possibly even in the same order as the memory image itself. The cost of the increased memory footprint is a disadvantage for mass-market products.

SUMMARY

The above and other problems are solved by a method of generating a delta file, the delta file including update instructions for causing a target processing device to transform a current memory image module into an updated memory image module; the method comprising:

incorporating a parametric representation of a first memory address in the delta file, the parametric representation being parametric with respect to at least the location of the current memory image module in memory space and the location of the updated memory image module in memory space; and incorporating parameter resolution instructions in the delta file.

Consequently, the method described herein generates a parametric delta file, i.e. a delta file that is not completely specified, but instead made parametric with respect to target specific data. The parameterised delta file is transferred from a system that generates the delta file to the target system, e.g. a mobile terminal. When the delta file is applied to the installed memory image on the target system, corresponding parameter values are assigned to the parameters. It is thus possible to use the same delta update package irrespective of where and in which environment it is applied.

Furthermore, once the parameter values are known, the parameterized delta file may be directly applied to the installed image without the need for transforming the installed image into a canonical form prior to the installation. Hence, it is an advantage of the parametric delta update procedure described herein that it provides a direct update of an installed load module into a newer version without first having to uninstall, rebase or realign the old version. Consequently, the method described herein provides a memory-efficient update process.

In particular, while the above prior art system requires storage of the complete relocation information together with the file to be rebased, no relocation information needs to be stored on the target system that would allow a re-transformation of the installed version into a canonical form. In embodiments of the method described herein it suffices to maintain ingoing and outgoing references to/from memory modules.

Furthermore, during the update process, the amount of temporary memory required during the installation is reduced, since no canonical form of the installed version needs to be generated by the target device.

It is a further advantage of the method described herein that a load module may simply be updated without involvement from any operating system loader process or the like. In particular, the update may be performed by an update agent that generates the updated memory image in place. Consequently, the process may be applied to the firmware of the target system, even if the firmware is executed in place, because the firmware does not need to be running during the update process.

In one embodiment, the method comprises generating the delta file from relocatable versions of the current and updated memory image modules, the relocatable versions including symbolic references to memory addresses, and from current and updated relocation instructions for said symbolic references in the respective relocatable versions of the current and updated memory image modules. Hence, the delta file is generated as to reflect modifications between relocatable versions of the memory image, i.e. versions where symbolic references to memory addresses have not yet been resolved, thereby allowing the relocatable versions to be loaded at different memory locations.

The relocatable version of the current and updated memory image modules may include object code, i.e. a computer-readable program code, typically expressed in binary machine language, which is normally an output of a given translation process, usually referred to as compilation, where the output is in principle ready to be executed by a computer.

The relocatable load modules may comprise symbolic references that refer to other locations in the load module or even to other load modules, e.g. to functions, variables, etc. that are defined elsewhere. In particular, a relocatable load module typically includes symbolic references and corresponding relocation information, the latter of which includes instructions regarding the resolution of the symbolic references. One interesting property of a relocatable module is that neither the start address nor the addresses of some or all referenced symbols are determined yet.

In one embodiment, generating the delta file further includes comparing the relocatable versions of the current and updated memory image modules so as to identify at least one common substring; and comparing includes comparing the symbolic references by comparing said symbolic references and the corresponding resolution instructions. Consequently, the delta file generation process treats symbolic references separately when comparing current and updated versions, thereby improving the performance of the delta generation, in particular decreasing the size of the resulting update package. In particular, in one embodiment, comparing the symbolic references includes determining symbolic references to be equal only if said symbolic references are equal in the relocatable versions of the current and updated memory image modules and if the corresponding current and updated resolution instructions for said symbolic references are equal.

In some embodiments, the method further comprises, responsive to an identification of a common substring in the relocatable versions of the current and updated memory image modules:

comparing respective sizes associated with an add instruction for causing the target processing device to add the identified common substring to the updated memory image module and a copy instruction for causing the target processing device to copy the identified common substring from the current memory image module to the updated memory image module, wherein comparing the respective sizes includes comparing the respective sizes of the add and copy instructions and of the respective parameter resolution instructions for symbolic references included in the common substring, if any, so as to determine a smallest size one of the respective sizes; and responsive to a result of the comparing, generating an add instruction or a copy instruction corresponding to the determined smallest size.

Consequently, unprofitable copy operations may be replaced by add operations. In particular, for the determination as to whether to choose a copy or an add operation, not only the size of the substring and the size of the actual copy and add instructions are considered but also the size of the parameter resolution instructions, thereby resulting in a more resource efficient delta file.

In some embodiments, the method includes a pre-processing step, a delta file generation step, and a post-processing step, wherein the pre-processing step includes generating respective canonical representations of respective relocatable versions of the current and updated memory image modules, wherein symbolic references to memory addresses are replaced by predetermined memory content; and forwarding information about the replaced symbolic references to the post-processing step;

wherein the delta file generation step includes generating a delta file from the canonical representations of the relocatable current and updated memory image modules; and wherein the post-processing step includes generating the parameter resolution instructions from the forwarded information about replaced symbolic references and from the generated delta file.

Consequently, the method may be implemented based on an conventional delta file generation tool, thereby avoiding the need for a costly modification of delta-file generation tools.

In some embodiments, the current memory image module is stored in a storage medium associated with the target processing device, e.g. a memory of a processing device.

In some embodiments, the updated memory image module includes at least one reference to the first memory address.

As mentioned above, the delta file is parametrised with respect to the actual position in memory of the baseline version and the location of the updated memory image module in memory space. The location of the updated memory image may be the start address at which a target device determines to load the updated memory image module. Furthermore, the delta file may be parametrised with respect to additional information that may be specific to a particular target system. In one embodiment, the update instructions are parameterized with respect to the following parameters: the location of the current memory image module in memory space, the location of the updated memory image module in memory space, and each address value referenced to by the updated memory image module, the address value being external to the updated memory image module, thereby providing an efficient parametric update system based on no more than three parameters. Accordingly, in one embodiment, the load process on the target system determines/obtains the location of the current memory image module in memory space and a corresponding location of the updated memory image. Based on these parameter values, the load process generates the updated memory image module directly from the current memory image module and from the received parametric delta file.

Further preferred embodiments are disclosed in the dependant claims.

It is noted that the features of the methods described above and in the following may be implemented in software and carried out on a data processing system or other processing means caused by the execution of program code means such as computer-executable instructions. Here and in the following, the term processing means comprises any circuit and/or device suitably adapted to perform the above functions. In particular, the term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a Random Access Memory (RAM), from a storage medium or from another computer/computing device via a computer network. Alternatively, the described features may be implemented by hardwired circuitry instead of software or in combination with software.

The present invention can be implemented in different ways including the method described above and in the following, a method of loading an updated memory image, a data processing system, and further product means, each yielding one or more of the benefits and advantages described in connection with the first-mentioned method, and each having one or more preferred embodiments corresponding to the preferred embodiments described in connection with the first-mentioned method and/or disclosed in the dependant claims.

In particular, according to one aspect a method of loading an updated memory image module into a storage medium, which storage medium has stored thereon a current memory image module, comprises:

receiving a delta file including update instructions, wherein the update instructions include a parametric representation of at least a first memory address, the parametric representation being parametric with respect to at least the location of the current memory image module in memory space and the location of the updated memory image module in memory space; and wherein the delta file further includes parameter resolution instructions;

transforming, responsive to the received update instructions and to the parameter resolution instructions, the current memory image module into the updated memory image module.

An overall method of performing a delta update of a current memory image module with an updated memory image module, the current memory image module being stored in a storage medium associated with a target processing device, may thus comprise:

generating a delta file including update instructions adapted to cause the target processing device to transform the current memory image module into the updated memory image module; wherein said update instructions include a parametric representation of a first memory address, the parametric representation being parametric with respect to at least the location of the current memory image module in memory space and the location of the updated memory image module in memory space; and wherein the delta file further includes parameter resolution instructions;

sending said generated delta file to the target processing device;

transforming, responsive to the received update instructions and to the parameter resolution instructions, the current memory image module into the updated memory image module.

In some embodiments, the parameter resolution instructions are adapted to cause the target processing device to determine a value of the location of the current memory image module in memory space and the location of the updated memory image module in memory space, and to determine an address value of the first memory address from the parametric representation and the determined value. Accordingly, in some embodiments, transforming includes determining a value of the location of the current memory image module in memory space and the location of the updated memory image module in memory space, and determining an address value of the first memory address from the parametric representation and the determined value.

In some embodiments, the method further comprises storing the updated memory image module in a persistent memory.

In some embodiments, the method further comprises executing the updated program code from the persistent memory.

When the method further comprises determining/obtaining a location of the current memory image module in memory space and a location of the updated memory image module in memory space, the target system determines the location of the updated memory image module at installation time.

In some embodiments, the method further comprises determining/obtaining a global symbol table, the global symbol table including at least one address value addressable by the updated memory image module, the address value being external to the updated memory image module. Hence, if the load module to be updated includes references to memory addresses outside the load module, e.g. addresses in other load modules, such references are parameterised during the delta file generation and the actual values of these parameters are determined by the load process on the target system. Consequently, the locations of other load modules which the load module to be installed refers to need not be known by the off-line tools that generate the delta file. It is a further advantage of the parametric delta update process described herein that it does not require storage of relocation information for all references. It suffices to maintain a list of global symbols, i.e. symbols related to external references.

In some embodiments, the global symbol table includes at least one current address value within the current memory image module addressable by other memory image modules, and the method comprises updating the current address value with a corresponding updated address value within the updated memory image module. Hence, the global symbol table is updated with the updated values of the symbolic references of the updated load module that are referred to from other load modules, if any, thereby allowing an update of any other load modules that refer to the currently updated module. Accordingly, in some embodiments, the method further comprises updating, from said current address value to said updated address value, all references in other memory image modules which references refer to the current address value.

In some embodiments, the method further comprises providing a list of outgoing references for each memory image module, each list of outgoing references including a list of global symbols addressed from the corresponding memory image module and which global symbols are external to the memory image module. Consequently, an efficient mechanism for the update of global symbols is provided.

In some embodiments, the relocatable versions of the current and updated memory image modules include program code in an object code format.

According to another aspect, a data processing system is suitably programmed to perform the steps of the method described above and in the following.

According to another aspect, a computer program product comprises program code means adapted to cause a data processing system to perform the method described above and in the following, when said program code means are executed on the data processing system. The computer program product may be embodied as a computer-readable medium having stored thereon said program code means, such as optical disks, hard disks, floppy disks, tapes, CD ROMs, flash memory, memory sticks, and/or other types of magnetic and/or optical storage media.

According to another aspect, a processing device comprises: a storage medium for storing a current memory image module; a communications interface for receiving a delta file, the delta file including update instructions, the update instructions including a parametric representation of a first memory address, the parametric representation being parametric with respect to at least the location of the current memory image module in memory space and the location of the updated memory image module in memory space; and wherein the delta file further includes parameter resolution instructions; and processing means adapted to transform, responsive to the received update instructions and to the parameter resolution instructions, the current memory image module into an updated memory image module.

In some embodiments, the processing means is further adapted to store the updated memory image module in a persistent memory.

In some embodiments, the processing means is further adapted to execute the updated program code from the persistent memory.

In some embodiments, the processing means is further adapted to determine/obtain a location of the current memory image module in memory space and a location of the updated memory image module in memory space.

In some embodiments, the processing means is further adapted to determine/obtain a global symbol table, the global symbol table including at least one address value addressable by the updated memory image module, the address value being external to the updated memory image module.

In some embodiments, the global symbol table includes at least one current address value within the current memory image module addressable by other memory image modules, and the processing means is further adapted to update the current address value with a corresponding updated address value within the updated memory image module.

In some embodiments, the processing means is further adapted to update, from said current address value to said updated address value, all references in other memory image modules stored in the storage medium, which references refer to the current address value.

In some embodiments, the processing device has stored therein a list of outgoing references for each memory image module, each list of outgoing references including a list of global symbols addressed from the corresponding memory image module and which global symbols are external to the memory image module.

A system for generating a delta file, the delta file including update instructions for causing a target processing device to transform a current memory image module into an updated memory image module, comprises:
 storage means for storing a representation of a current software version corresponding to the current memory image module;
 processing means adapted to generate a delta file including a parametric representation of a first memory address, the parametric representation being parametric with respect to at least the location of the current memory image module in memory space and the location of the updated memory image module in memory space; and to include parameter resolution instructions in the delta file.

In some embodiments, the processing means is further adapted to generate the delta file from relocatable versions of the current and updated memory images, the relocatable versions including symbolic references to memory addresses, and from current and updated relocation instructions for said symbolic references in the respective relocatable versions of the current and updated memory image modules.

In some embodiments, the processing means is further adapted to compare the relocatable versions of the current and updated memory image modules as to identify at least one common substring; and comparing includes comparing the symbolic references by comparing said symbolic references and the corresponding resolution instructions.

In some embodiments, the processing means is further adapted to determine symbolic references to be equal only if said symbolic references are equal in the relocatable versions of the current and updated memory image modules and if the corresponding current and updated resolution instructions for said symbolic references are equal.

In some embodiments, the processing means is further adapted, responsive to an identification of a common substring in the relocatable versions of the current and updated memory image modules:

to compare respective sizes associated with an add instruction for causing the target processing device to add the identified common substring to the updated memory image module and a copy instruction for causing the target processing device to copy the identified common substring from the current memory image module to the updated memory image module, wherein comparing the respective sizes includes comparing the respective sizes of the add and copy instructions and of the respective parameter resolution instructions for symbolic references included in the common substring, if any; and
  responsive to a result of the comparing, to generate an add instruction or a copy instruction.

In some embodiments, the processing means is further adapted to execute a pre-processing step, a delta file generation step, and a post-processing step, wherein the pre-processing step includes generating respective canonical representations of respective relocatable versions of the current and updated memory image modules, wherein symbolic references to memory addresses are replaced by predetermined memory content; and
  forwarding information about the replaced symbolic references to the post-processing step;
wherein the delta file generation step includes generating a delta file from the canonical representations of the relocatable current and updated memory image modules; and
wherein the post-processing step includes generating the parameter resolution instructions from the forwarded information about replaced symbolic references and from the generated delta file.

In some embodiments, the system further comprises communications means adapted to send the generated delta file to the processing device.

In some embodiments, the updated memory image module includes at least one reference to the first memory address.

A system for performing a delta update of a current memory image module with an updated memory image module comprises a system for generating a delta file as described herein, and a processing device as described herein.

For the purpose of the present description, the terms processing device and electronic device comprise any device comprising a memory such as a flash memory for storing program code. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, or the like.

BRIEF DESCRIPTION OF THE DRAWINGS

The above and other aspects will be apparent and elucidated from the embodiments described in the following with reference to the drawings in which.

DETAILED DESCRIPTION

Figure 1:
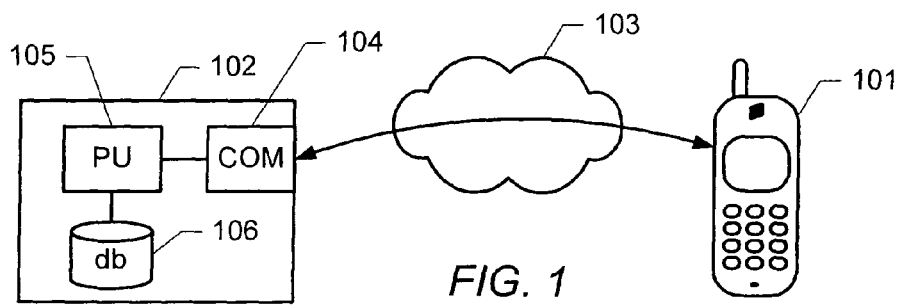
FIG. 1 schematically shows a block diagram of an embodiment of a system for updating software in a mobile terminal.

FIG. 1 schematically shows a block diagram of an embodiment of a system for updating software in an electronic device such as a mobile terminal. The system comprises a mobile terminal 101, e.g. a mobile telephone or the like, a software updating system 102, and a communications interface 103.

The software updating system 102 may comprise a server computer having access to the communications network. In some embodiments, the functionality of the server computer may be distributed among a plurality of computers, e.g. computers connected via a computer network, e.g. a local area network, a wide area network, an Internet, or the like. The software updating system 102 comprises an interface circuit 104 allowing the software updating system 102 to communicate data via the communications interface 103. For example, the interface circuit 104 may comprise a serial port, a parallel port, a short range wireless communications interface, e.g. an infrared port, a Bluetooth transceiver, or the like. Further examples of interface circuits include a network card, a DSL modem, a gateway computer, or the like.

The software updating system 102 further comprises a processing unit 105, e.g. the CPU of a server computer, suitably programmed to control and to perform the update process. The processing unit 105 may further perform the actual code generation process described herein. However, typically the code generation will be performed by another computer, and the generated code will then be transferred to the processing unit 105. The software updating system 102 further comprises a version database/repository 106 having stored therein at least a base/current version and an updated version of the software to be updated, e.g. in the form of memory images and/or object code and/or further information such as relocation information. In some embodiments, the version database may further comprise additional information, e.g. a plurality of base versions and/or updated versions, e.g. for different models of mobile terminals, for different groups of customers, and/or the like.

The communications interface 103 may be any suitable wired or wireless communications interface for communicating data between the software updating system 102 and the mobile terminal 101. For example, in the case of a mobile telephone adapted to communicate via a cellular communications network, e.g. a GSM network, a UMTS network, a GPRS network, or the like, the communication between the software updating system 102 and the mobile terminal 101 in connection with a software update may be performed via that cellular communications network, thereby avoiding the need for additional communications interfaces in the mobile terminal 101.

Hence, in order to update software on the mobile terminal 101, the mobile terminal 101 may receive updating instructions from the software updating system 102, e.g. including the images of the memory sectors to be rewritten.

In a differential software updating system 102 using delta files, the updating instructions are generated such that they enable the mobile terminal to generate the updated software version from the existing version already stored in the mobile terminal 101 and from additional information included in the updating instructions. The delta file may be applied in-place, i.e. the changes are made by the mobile terminal 101 on the existing image, thereby requiring little additional storage. Furthermore, since only the delta file needs to be loaded and since the delta file typically is considerably smaller than the new version, the loading time is reduced by the above method.

Hence, in the above, a possible scenario is described in which the process and system described herein may be applied. However, it will be appreciated that the delta-update process described herein may be applied to other update scenarios as well. For example, the update may be provided to the target device via other media, e.g. other communications channels, via a computer-readable medium, etc. Embodiments of the delta-update process will be described in greater detail below.

Figure 2:
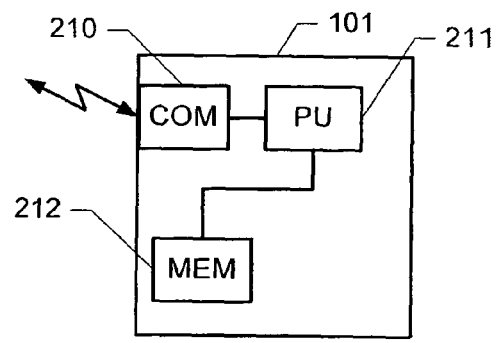
FIG. 2 schematically shows a block diagram of an electronic device such as a mobile terminal.

FIG. 2 schematically shows a block diagram of an example of an electronic device such as a mobile terminal. The mobile terminal 101 comprises a communications block 210, a processing unit 211, and a memory unit 212.

The communications block 210 comprises circuitry and/or devices allowing radio-based communication of data via a cellular communications network. Hence, for the purpose of the present description, the communications block 210 comprises receiver circuitry for receiving data signals. The communications block may further comprise circuitry for suitably processing the signals, e.g. modulating, coding, amplifying, etc., the signals by suitable techniques well known in the art of radio communications.

The mobile terminal 101 further comprises a processing unit 211, e.g. a suitably programmed microprocessor. The processing unit is adapted to perform various functions related to the update process, e.g. functions such as determining the version of the software stored in the mobile terminal 101, calculating checksums of the stored software, generating an updated version of the software upon receipt of corresponding update instructions, and/or the like.

The memory unit 212 has stored thereon the software and/or other data in a predetermined version. For example, the memory 212 may comprise the firmware of the mobile terminal that implements the basic functions of the mobile terminal when loaded into and executed by the processing unit 211. The firmware may further comprise an operating system allowing application software to be executed. Accordingly, the memory 212 may further have stored thereon application software providing additional functionality. The memory 212 is addressed using a suitable address space, thereby allowing the processing unit to access selected parts of the memory. In some embodiments, the memory 212 may be logically or physically divided in a plurality of memory sectors. For example, the memory 212 may comprise flash memory allowing data to be written in sectors of a predetermined size. However, it is understood that any other addressing of the memory may be used, instead. It is further understood that the updating process described herein may be applied to the entire memory 212, e.g. if the entire image of the flash memory of a mobile phone is to be updated, or to only predetermined parts of the memory, e.g. if one or more software applications are to be updated.

Figure 3:
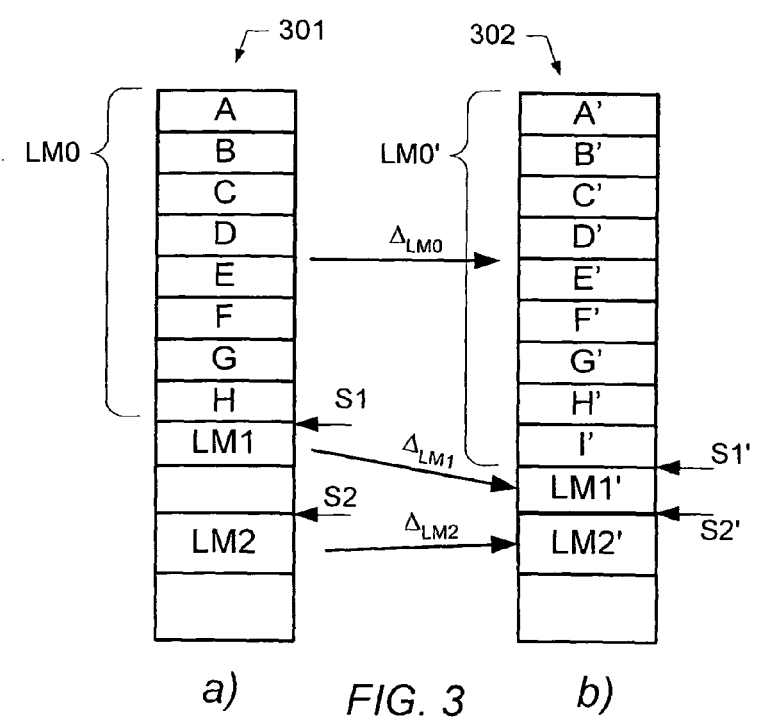
FIG. 3 illustrates an example of a memory layout of a processing device before and after a software update.

FIG. 3 illustrates an example of a memory layout of a processing device before and after a software update. FIG. 3a illustrates an example of the memory layout of a program code version corresponding to a currently installed memory image, generally referred to by reference numeral 301. The memory image includes a first load module LM0, and two further load modules designated LM1 and LM2, respectively. For the purpose of the example of FIG. 3, the load module LM1 is assumed to be placed adjacent to LM0. Consequently, the exact location in memory of the load modules LM1 and LM2 may vary, e.g. depending on the size of the load module LM0 or because their location in memory is determined by the target device at load time for other reasons. Knowledge about their location is thus not available at the server side as an input to the delta generation process.

FIG. 3b illustrates an updated version corresponding to an updated memory image, generally designated 302. In this example, it is assumed that the load module LM0 has been updated by means of a delta file $\Delta_{LM0}$ resulting in an updated load module LM0'. The updated load module LM0' has a different size than the original load module LM0. Similarly each of the load modules LM1 and LM2 has been updated by respective delta files $\Delta_{LM1}$ and $\Delta_{LM2}$ resulting in respective updated versions LM1' and LM2'. In particular, the updated load modules LM1' and LM2' are now located at different start/base addresses S1' and S2', respectively, that are different from the corresponding start/base addresses S1 and S2 of the original/baseline version. When the selection of the start addresses of the load modules is taken by the target device at load time, the delta file generation process that has generated the delta files $\Delta_{LM1}$ and $\Delta_{LM2}$ may neither know the start addresses S1 and S2 nor the updated start addresses S1' and S2'.

Hence, in the above scenario, the memory structure includes a load module that is always located at a given position and one or more load modules that are located at variable positions. It will be appreciated that in other memory structures more than one module may have fixed positions, while in yet other memory structures all software modules may have variable locations. The parametric delta update procedure described herein supports delta updating of load modules, e.g. dynamically loaded load modules, whose location is not known to the delta file generation process or system. In particular, in a scenario where the software stored in the memory of the target device includes an assembly of load modules, the method described herein may be used to update the entire memory image or separate parts of the software. These load modules could, for example, correspond to libraries for different functionality. In the case where several different versions of the software contain the same module, it is possible to update that particular module in all versions with the same update package.

In the following, different examples of an incremental software update process will be described with reference to FIGS. 4-10. In the drawings like reference numbers refer to like or corresponding components, features, entities, etc.

Figure 4:
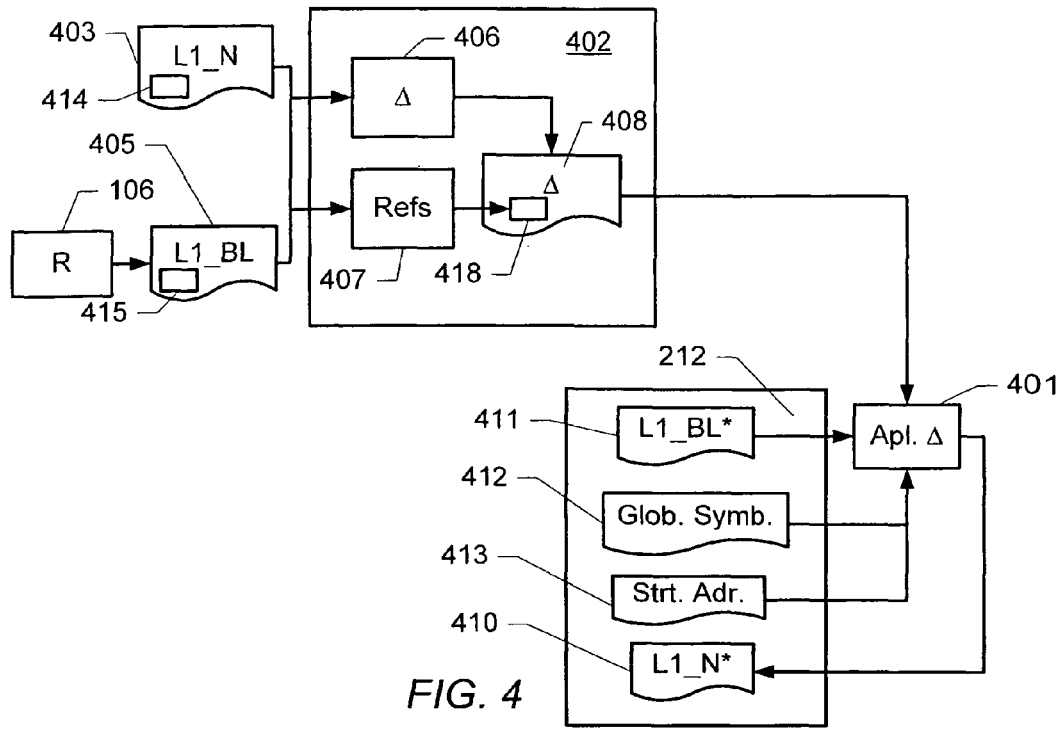
FIG. 4 shows a block diagram of an embodiment of a software update process.

FIG. 4 shows a block diagram of an embodiment of a software update process. The process comprises a delta file generation process 402 performed by an update server for generating a parameterised delta file 408, and a delta file application process 401 performed by the target device for applying the delta file 408. The delta file generation process may be performed by a delta file generator, i.e. a software program or functional component of a software program executed by the update server that generates a delta file representative of differences between the current program code version and the updated program code version. Similarly, the delta file application process may be performed by a delta file update agent, i.e. a software program or functional component of a software program executed by the target device.

The delta file generation process 402 receives an updated version of a load module L1_N, generally designated 403, and a corresponding baseline version L1_BL, generally designated 405, of that load module. The updated version L1_N is typically received from a code repository or from a program code generation process (not explicitly shown) e.g. a system including a compiler and linker that generates executable code from a source code. The baseline version corresponds to the software version currently installed on the target device and is received from a database 106 of load modules, a version management system, or another suitable code repository. In some embodiments, the delta generator 402 may receive additional inputs, e.g. from the repository 106, such as extra link information, e.g. in the form of a so-called map file. A load module is assumed to be in an object code format that, in addition to the raw binary, contains relocation information 414 and 415, respectively. The relocation information is used when resolving the symbolic references, which resolution is deferred to load time.

The delta file generation process 402 generates a delta file 408 that is sent as an update package, or as a part of an update package, to the target device whose memory is to be updated from the current memory image to the updated memory image. To this end the target device executes the delta file application process 401 described in greater detail below.

In general, the generation of a delta file for updating a baseline file to a new file may schematically be illustrated by the following operations $$\text{file}_{new} - \text{file}_{base} \rightarrow \Delta \text{file}.$$

Correspondingly, the actual generation of the new version may then be performed by the mobile terminal according to the following operation $$\text{file}_{base} + \Delta \text{file} \rightarrow \text{file}_{new}.$$

It is understood that the above operations of generating the delta file (denoted as "−" in the above notation) and generating the new version on the mobile terminal (denoted as "+" operation in the above notation) may comprise more or less complex operations. A delta file generally includes at least two parts: a pool of new content and a list of instructions, where the instructions describe how to combine the new content with the installed image. When creating the new image, each word is either copied from the installed image or added from the pool of new content.

In addition to the above components, the parametric delta file 408 includes information 418 about internal and external references (both absolute and relative). The information 418 may be included in a separate section of the delta file, the information may be interleaved with the remaining instructions of the delta file, and/or incorporated in the delta file in any other suitable way. Since the locations of the load modules present in the memory of the target device are unknown to the update server, the extended delta file 408 is made parametric, e.g. with respect to the start addresses of the new and baseline versions and the locations of the global symbols. Accordingly, the delta file generation process 402 comprises a delta generator module 406 that generates a set of instructions and a pool of new content, and a reference extraction module 407 which extracts the external and internal references from the baseline and the updated versions, and which includes that information in the parametric delta file. Parameterization may extend the number of sections in the delta file and/or the number of instructions.

In one embodiment, the parametric delta file is parameterised with respect to the following three parameters:
- The start address of the installed version of the load module, i.e. of the baseline version L1_BL.
- The start address of the new version of the load module L1_N.
- The values of external symbols, which are used by the new load module.

When the delta file 408 is applied, the process 401 receives the start addresses 413, i.e. the start address of the currently installed image L1_BL* generally designated 411, and the start address at which the target device has determined to load the new image L1_N* designated 410. The process 401 further receives a global symbol table 412 stored in the memory 212 of the target device. The global symbol table includes a list of global symbolic references, i.e. symbolic references between different software modules, and their respective address values. From the values of these parameters, the process 401 instantiates the parametric delta file, and applies the instantiated delta file to the installed image L1_BL* as to generate the new image L1_New*, designated 410, that is stored in the memory 212 at the determined new start address.

The application of a parametric delta on a load module may be described as:

Step 1: Loadmodule$_{baseline}$+Δ(start$_{baseline}$, start$_{new}$, Symbols$_i$)→Loadmodule$_{new}$ Step 2: Symbols$_i$→Symbols$_{i+1}$ Step 3: References$_i^{loadmodule}$→References$_{i+1}^{loadmodule}$.

Hence, in step 1, the delta is applied to the baseline version. The parameters to the delta are the start addresses start$_{baseline}$, start$_{new}$ of the baseline and the new version, respectively, and the set Symbols$_i$ of global symbols that the load module may refer to. In the next step, the global symbol table is updated with the symbols exported from the new version of the load module. Furthermore, all references from other load modules into the baseline load module to be updated may also need to be updated to point to the correct symbols of the new version. To this end, a reference map including a map of outgoing references is associated with each installed load module. Accordingly, during a third step, the reference map References$_i^{loadmodule}$ of the currently updated load module is updated. Subsequently, the references from the other load modules into the updated load modules are updated based on the updated reference map.

It is interesting to note that the delta file application process 401 applies the delta file to an installed binary image 411, whereas the input to delta file generation process 402 includes load modules 403 and 405, i.e. files in an object code format. The object code format includes relocation information 414 and 415, respectively, that is not present in the installed image. The relocation information is consumed when a load module is installed (a normal "full" install). During this process, symbolic references are resolved.

As was illustrated by the above example, parameterization of the delta file affects the delta generation, the delta file format and the application of delta files. Nevertheless, the parameterisation of delta files may be implemented such that it utilizes conventional delta generation techniques, as will now be described with reference to FIGS. 5 and 6.

Figure 5:
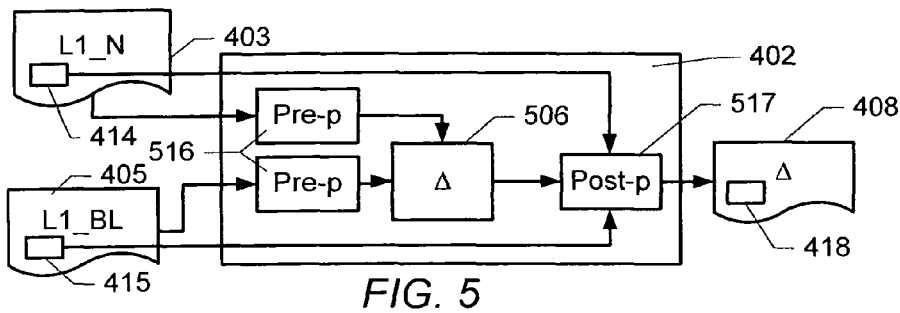
FIG. 5 shows a functional block diagram of an embodiment of a delta file generation process.

FIG. 5 shows a functional block diagram of an embodiment of a delta file generation process. The delta file generation process 402 includes a pre-processor 516 and a post-processor 517 in addition to a delta generator module 506. The delta generator module 506 may be a conventional delta generator that may be unaware of the parameterization. Examples of suitable delta file techniques include the methods described in U.S. Pat. No. 6,546,552 and in "Compressing Differences of Executable Code" by Brenda Baker, Udi Manber, and Robert Muth, in ACM SIGPLAN Workshop on Compiler Support for System Software (WCSSS'99), 1999.

The purpose of the pre-processor 516 is to excerpt a binary image from each of the two load modules 403 and 405, i.e. from the updated/new version L1_N and from the baseline version L1_BL, while keeping track of the references in each of the load modules. The binary images are fed in the delta generator 506, and the information about the references is fed into the post-processor 517. The post-processor receives the information from the pre-processor 516 and the delta file generated by the delta generator 506. The post-processor then extends the delta file with additional information 418 using the information on references collected by the pre-processor 516, thus generating a parametric delta file 408.

Figure 6:
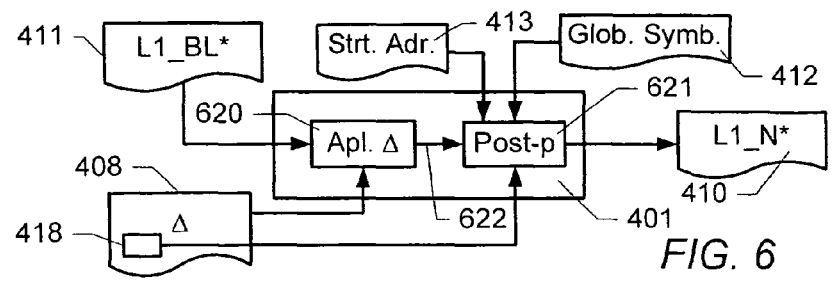
FIG. 6 shows a functional block diagram of an embodiment of a delta update agent.

It is noted that the update agent in the target device may be implemented to have a similar architecture. FIG. 6 shows a functional block diagram of an embodiment of a delta file application process. The delta file application process includes a delta update module 620 followed by a post-processor 621. The update module 620 may be a conventional update agent that is unaware of the parameterization. The post-processor 621 receives the output 622 of the delta update module 620 and the actual parameter values, i.e. in this embodiment the global symbol table 412, and the start addresses 413 of the load module in the baseline and the updated version. From this information, the post-processor instantiates the image 622 that is produced by the update module 620, resulting in the updated image 410.

The pre-processor 516 of the delta file generation process mimics the installation process. As mentioned above, the installation process consumes the relocation information and resolves symbolic references. By mimicking this process, the pre-processor 516 creates a representation of the load modules that may serve as an input to a conventional delta file generator which in turn creates a delta file that can be related to the installed image. However, references can still not be resolved, since the location of the installed image is not known to the delta generation process. Consequently the relocation information 414 and 415, which includes the required "recipe" for resolving the references, is passed on to the post-processor 517. Instead of resolving references, the pre-processor may make them as similar as possible, thereby facilitating the job of the delta generator 506. For example, the pre-processor 516 may replace all references by a predetermined value, e.g. zero.

In general, two kinds of symbolic references are of particular interest: absolute and relative references. An absolute reference is simply resolved by substituting the value of the symbol by the placeholder in the raw binary content. A relative reference is resolved differently: the difference between the value of the symbol and the source address is computed by a corresponding formula.

The destination of a reference is a location in the code. The locations are either internal or external to the load module that contains the reference. An internal location has a known offset within the load module and can be parameterized with respect to the start address of the load module (i.e. start+$\text{offset}_D$). Destinations which are external to the load module are represented by symbolic names. The source of a reference, i.e. the location from which the reference is made, is by definition internal to the load module. Therefore, the source can be represented as (start+$\text{offset}_S$).

Table 1 summarizes the relocation formulas for the above types of references:

TABLE 1

Relocation formulas for absolute and relative references to internal and external locations.

| Destination | reference | |
|---|---|---|
| | absolute reference | relative reference |
| internal destination | D = start + $\text{offset}_D$ | D − S = $\text{offset}_D$ − $\text{offset}_S$ |
| external destination | D = $\text{symbol}_D$ | D − S = $\text{symbol}_D$ − (start + $\text{offset}_S$) |

Relative references to internal locations can be resolved at build time, i.e. during or prior to the delta file generation process. This kind of reference is said to be location independent. Consequently, three types of references remain to be resolved: Absolute references to internal locations and absolute as well as relative references to external locations.

Absolute references to locations which are internal to the load module depend on the start address (start) of the load module. Absolute references to external locations depend on the unknown symbolic address ($\text{symbol}_D$). Relative references to external locations depend of the unknown symbolic address and the start address of the load module.

One way of making images similar is to use a specific constant, for instance zero, in place of unresolved references. All absolute references would then seem to point to address zero and unresolved relative references would seem to point to the address following the location, from which the reference is made. Some delta generators are aware of relative references (e.g. the delta generator disclosed in U.S. Pat. No. 6,546,552). In such cases, when the pre-processor causes the unresolved relative references to point to the same location, for instance the beginning of the load module, a more efficient delta file generation may be provided.

The post-processor 517 of the delta file generation process includes suitable information about the references in the delta file, as to allow the update agent to resolve the references. When the delta file is applied in the target device, the update agent is instructed to put together a new binary image. For the purpose of the present description it may be assumed that it does so by either copying words from the installed image or by adding content from the pool that is provided as part of the delta file. In the following, the above two general alternatives are assumed to be represented by a "copy" instruction and an "add" instruction, respectively, in the delta file. However, it is understood that some delta generators may utilise different representations including subtypes and/or variants of these instructions.

In the following, the treatment of the above types of references by the post-processor 517 and the corresponding effect on the application of the delta file in the target device will be described. In order to describe the function of the post-processor 517 it is helpful to compare the result of applying the delta file generated by the delta generator 506 to an installed binary image without fixing the references. These results are summarised in table 2 below and compared to the desired results.

TABLE 2

The actual and desired results of applying a delta file.

| Row | Instruction type | Reference type | Actual result | Desired result |
|---|---|---|---|---|
| 1 | "Copy" | Absolute external | $Symbol_D$ | $Symbol_D$ |
| 2 | | Absolute internal | $Start_1 + Offset_1$ | $Start_2 + Offset_2$ |
| 3 | | Relative external | $Symbol_D - (Start_1 + Offset_1)$ | $Symbol_D - (Start_2 + Offset_2)$ |
| 4 | "Add" | Absolute external | 0 | $Symbol_D$ |
| 5 | | Absolute internal | 0 | $Start_2 + Offset_2$ |
| 6 | | Relative external | 0 (or $-Offset_2$) | $Symbol_D - (Start_2 + Offset_2)$ |

First consider the case, in which a reference is copied from the installed image to the new one, corresponding to rows 1-3 in table 2, e.g. caused by a corresponding "Copy" instruction in the delta file: If the reference is absolute and has an external symbol as destination (row 1 in table 2), the correct value ($Symbol_D$) will be copied from the installed image to the new image, i.e. no subsequent post-processing is required. In the two other cases (see Table 2, rows 2 and 3), the copied reference has to be fixed up, because the reference value in the installed image is based on the start address ($start_1$) and offset ($offset_1$) of the source of the reference in the installed load module, while the correctly updated value should be based on the corresponding values $start_2$ and $offset_2$ in the updated image. In the embodiment of FIG. 6, it is the job of the post-processor 621 to correct the references. Hence, in this embodiment, the delta update module 620 may result in the address values listed in the column "Actual values" and the post-processor 621 corrects the values as to generate the values listed in the column "Desired values". In order to enable the post-processor 621 of the update agent to perform this process, the post-processor 517 of the delta generator extends the delta file by a section 418. When copying references, the information inserted in the section 418 of the delta file may include the source location of the reference in the load module and the kind of reference (i.e. absolute external etc.).

If the reference is not copied, but added from the pool of new content included in the delta file, e.g. caused by a corresponding "Add" instruction in the delta file, a post processing set is required corresponding to rows 4-6 in table 2. As above, the post-processor 517 of the delta generator 506 extends the delta file by a section 418 which makes it possible to correct the references. In case of an added reference, the information included in section 418 of the delta file may include: The source location of the reference in the load module, the kind of reference, the destination (symbol and/or offset). It is noted that the value of $Offset_2$ in the case of row 6 in table 2 is known implicitly, since $Start_2 + Offset_2$ is the source location of the reference. It is further noted that the "Actual result" values in rows 4-6 of table 2 may depend on the result of the pre-processor 516 of the delta file generation process.

In table 2 it is assumed that the pre-processor 516 replaces all references by zeros, thereby mimicking updated references to be equal to the corresponding references in the installed image and causing the delta file generator to copy those references from the installed image corresponding to rows 1-3 in table 2. Nevertheless, as mentioned above, in an alternative embodiment the pre-processor 516 may cause relative references to point to the beginning of the load module rather than to the subsequent source address. In this case, the actual result value in row 6 would be $-Offset_2$ instead of 0.

Copied references (according to rows 2 and 3 of table 2) may be post-processed in block 621 by applying the same mechanism as when creating new references (according to rows 5 and 6 of table 2, respectively). Hence, in this case, the information that is copied from the installed image (i.e. the "actual results") is essentially disregarded by the post-processor 621.

Alternatively, the post-processor 517 may utilise the information in the installed image when generating the correct updated address values, thereby allowing a more compact representation of the delta file. For example, an absolute reference to an internal location (row 2 of table 2) involves a transformation from $W_1 = Start_1 + Offset_1$ to $W_2 = Start_2 + Offset_2$.

If $Offset_1$ and $Offset_2$ are the same—which can be checked by the delta file generation process—the above transformation reduces to:

$$W_2 = W_1 + Start_2 - Start_1$$

The start addresses of the load module $Start_1$ and $Start_2$ in the baseline and the updated version, respectively, are thus the parameters to be inserted, and the copied word, $W_1$, is copied from the installed image. Thus, it suffices for the post-processor 517 of the delta file generation process to specify the source location of the reference in the delta file.

The case of relative external references (row 3 of table 2) may be handled in the same way, resulting in the following transformation formula to be evaluated by the post-processor 621:

$$W_2 = W_1 + Start_1 + Offset_1 - Start_2 - Offset_2.$$

Hence, the dependence on $Symbol_D$ is removed, which means that the symbol does not have to be represented in the delta file.

Table 3 summarizes the record types that constitute the extension 418 of the delta file 408:

TABLE 3

Record types of the delta file extension 418 for use by the update agent post-processor.

| Row | Instruct. type | Reference type | Information provided in delta file |
|---|---|---|---|
| 1 | "Copy" | Absolute external | no information required |
| 2 | | Absolute internal | source of reference (if $Offset_1 = Offset_2$) source of reference, $Offset_2$ (otherwise) |
| 3 | | Relative external | source of reference, difference ($Offset_1 - Offset_2$) |
| 4 | "Add" | Absolute external | source of reference, symbol |
| 5 | | Absolute internal | source of reference, $Offset_2$ |
| 6 | | Relative external | source of reference, symbol |

The post-processor 517 of the delta generator produces the extended delta file as described above. To this end the post-processor 517 has access to the delta file produced by the delta generator 506 and to the relocation information 414 and 415 of both versions of the load module. For each reference in the new version of the load module, the post-processor 517 finds the corresponding "copy" or "add" instruction in the delta file. In the case of an "add" instruction, a corresponding record type (according to rows 4-6 of table 3) is produced.

When the post-processor 517 detects a "copy" instruction, the post-processor 517 follows the copy instruction to its origin, which can be achieved by emulating the delta application. The post-processor 517 looks up the origin from which data is to be copied in the baseline version 405 of the load module. If there is a matching reference also in the baseline load module, the post-processor 517 generates a corresponding record according to row 2 or 3 of table 3 depending on the reference type. No record is produced for absolute references to external locations (row 1).

However, there may not be a matching reference in the baseline load module, although there is a "copy" instruction in the delta file. This is an artefact of this embodiment of the pre-processing step 516, which makes distinct references look the same, e.g. by replacing all references with a predetermined constant. Furthermore, another artefact of this embodiment is that original binary memory content having the same value as the predetermined constant cannot be distinguished from a reference that was replaced by the pre-processor. In such situations, the post-processor 517 generates as a fallback a record corresponding to an "add" instruction, i.e. according to one of rows 4-6, depending on the reference type.

Hence, in the above, an embodiment of a parametric delta update process has been described that utilises conventional delta generation tools. In the following, embodiments will be described with reference to FIGS. 7-10 that utilise specifically adapted algorithms for delta file generation and delta file application. In this way, it is possible to generate smaller delta files. In particular such embodiments may take the size of the fix-up records into consideration when selecting the best sequence of copy and add instructions. Furthermore, the comparing of load modules rather than of binary images generated by a pre-processor allows for special handling of references.

Figure 7:
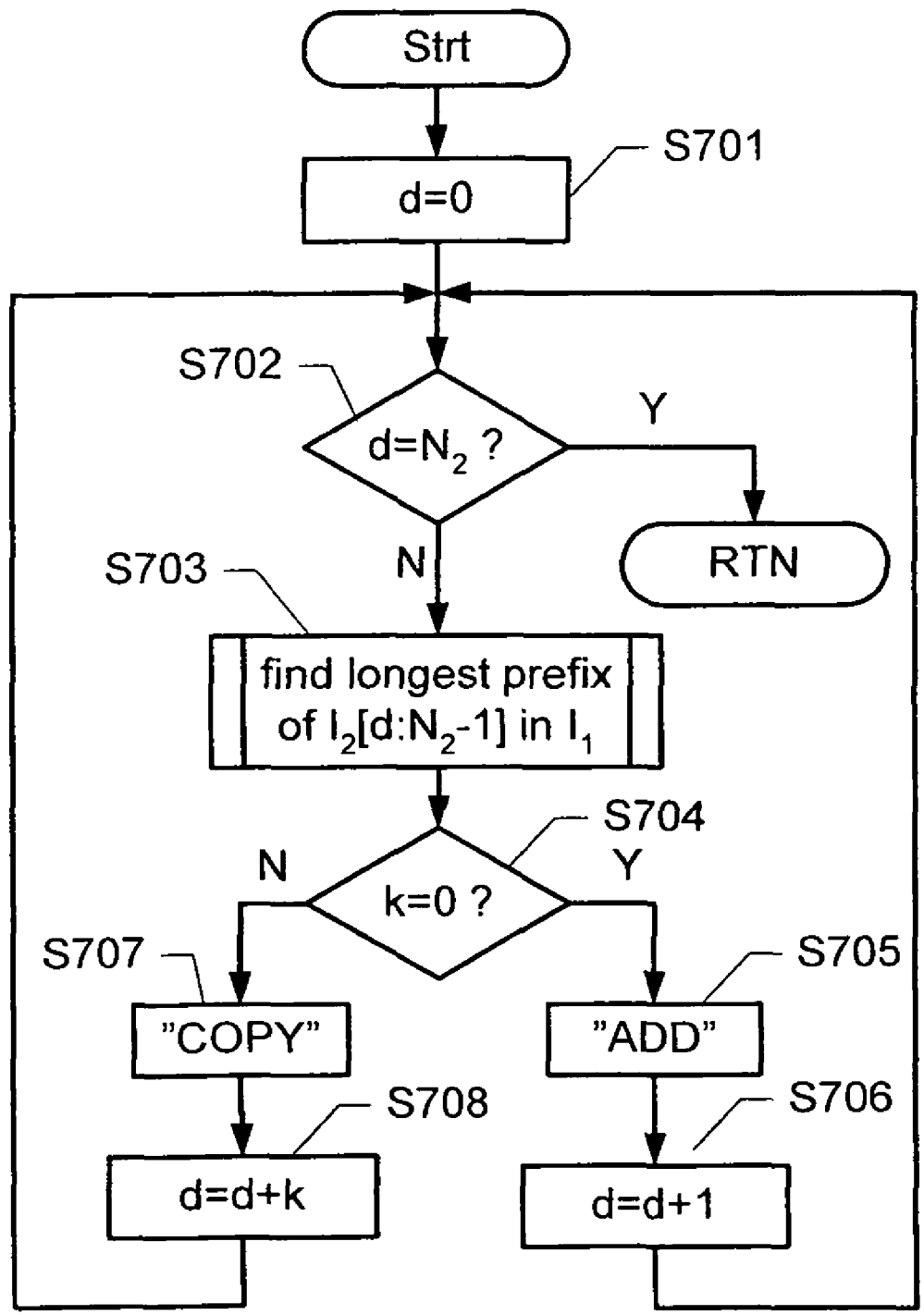
FIG. 7 shows a flow diagram of another embodiment of a delta file generation process.

FIG. 7 shows a flow diagram of another embodiment of a delta file generation process.

Generally, delta generation can be modelled as the problem of finding a minimal covering set of block moves (see e.g. Walter F. Tichy: The String-to-String Correction Problem with Block Moves; ACM Transactions on Computer Systems 2:4 (November 1984), pp 309-321).

A block move corresponds to a copy instruction in the delta file. For the purposes of delta generation, it is typically desirable to generate the smallest possible delta file, which generally corresponds to the solution with as few block copies as possible.

Optimum covers of block moves can be found using the following algorithm:
- Substrings of the new image, $I_2$, are located in the old (baseline) image, $I_1$ as to identify common substrings.
- Each common substring corresponds to a block copy. A so-called greedy algorithm identifies in each step the longest substring that is present in $I_1$ which is a prefix of $I_2$.

An more detailed example of such an algorithm is shown in FIG. 7.

In step S701 the process is initialised by setting a destination pointer d to zero (d=0), i.e. the pointer is initialised to point to the start of the updated image $I_2$.

The process then repeats the following steps (S702-S708) until the entire new image ($I_2$) has been processed:

Accordingly, in step S702 the process verifies whether the entire new image has been processed, i.e. whether $d=N_2$, where $N_2$ denotes the size of $I_2$. If $d=N_2$, the process terminates, otherwise the process proceeds at step S703.

In step S703, the process identifies the longest prefix of $I_2[d:N_2-1]$ in $I_1$. In a situation with no unresolved references finding the longest prefix corresponds to finding s such that k is maximal and $I_1[s]=I_2[d], I_1[s+1]=I_2[d+1], \ldots, I_1[s+k-1]=I_2[d+k-1]$. However, in the presence of unresolved references the process treats these references separate from other content of the image, as will be described in greater detail below.

In subsequent step S704, the process tests whether such a substring could be identified. If no such substring could be found (i.e. k=0), the process generates an "add" instruction (step S705) and advances d by one, unless there is a reference at d in $I_2$, in which case d is advanced by the length of that reference (step S706). Otherwise, the process generates a "copy" instruction (step S707), e.g. "copy s, k", i.e. an instruction causing the update agent in the target device to copy a substring of length k from the currently installed image starting at address s. Subsequently, the process advances d by k (step S708).

Typically, it is desirable to use an "add" instruction rather than a "copy" instruction, when the copied block is small (e.g. 3 bytes or less). This is due to the overhead of specifying the source pointer, s, and the length of the block, k, in the "copy" instruction. Many implementations of delta file generation algorithms find the minimal covering set, but replace small block copies by add instructions. Removal of uneconomical "copy" instructions may thus be performed as a post-processing step. Furthermore, in some embodiments, the post-processing step to the delta generation considers the size of the fix-up records, e.g. when choosing between a "copy" and an "add" instruction. In this way, unprofitable block moves are avoided. In particular, in some embodiments, the post-processor replaces a "copy" instruction, whenever the overhead of the "copy" instruction is larger than that of the alternative, which typically is to use an "add" instruction. The overhead of a "copy" instruction includes the storage required to represent the start position, the block length and the fix-up records that include address information for the resolution of references (e.g. the records of table 3). The overhead of an "add" instruction includes the storage required to represent the block length, the new content and the fix-up records (which may be of a different size than the corresponding fix-up records of the "copy" instruction, as illustrated by table 3). The postprocessor has the option of converting an unprofitable "copy" instruction to an "add" instruction. Further, it is possible to merge adjacent "add" instructions which result from post-processing.

As mentioned above, step S703 takes account of unresolved references when identifying common substrings. To this end, the process treats unresolved references symbols that are separate from the other content of the image. Since the value to be encoded in the image is not known until load time, equality can only be guaranteed between two references that are resolved using the same symbolic formula. For this reason, the delta file generation process matches/copies entire/complete references rather than partial references.

In the following, three examples of implementations of the step of finding the longest prefix of $I_2[d:N_2-1]$ in $I_1$ will be described with reference to FIGS. 8-10. All three examples make use of the relocation information which is available when generating the delta file, but which is not necessarily available when installing the delta file in the target device. In particular, the relocation information allows the unresolved references to be identified.

Let $R_1 = r_{11} \, r_{12} \, \ldots \, r_{1m1}$ be the collection of relocation records of the installed load module and $R_2 = r_{21} \, r_{22} \ldots r_{2m2}$ be the corresponding collection of the new load module. Each relocation record, $r_{jk}$, is assumed to specify the attributes necessary to resolve one reference. In particular, the location of the reference, source ($r_{jk}$), which is an offset within its image, is given by $r_{jk}$. For the purpose of the present description it is further assumed that two identical resolutions can be identified by means of the predicate equal ($r_{jk}, r_{mn}$).

Figure 8:
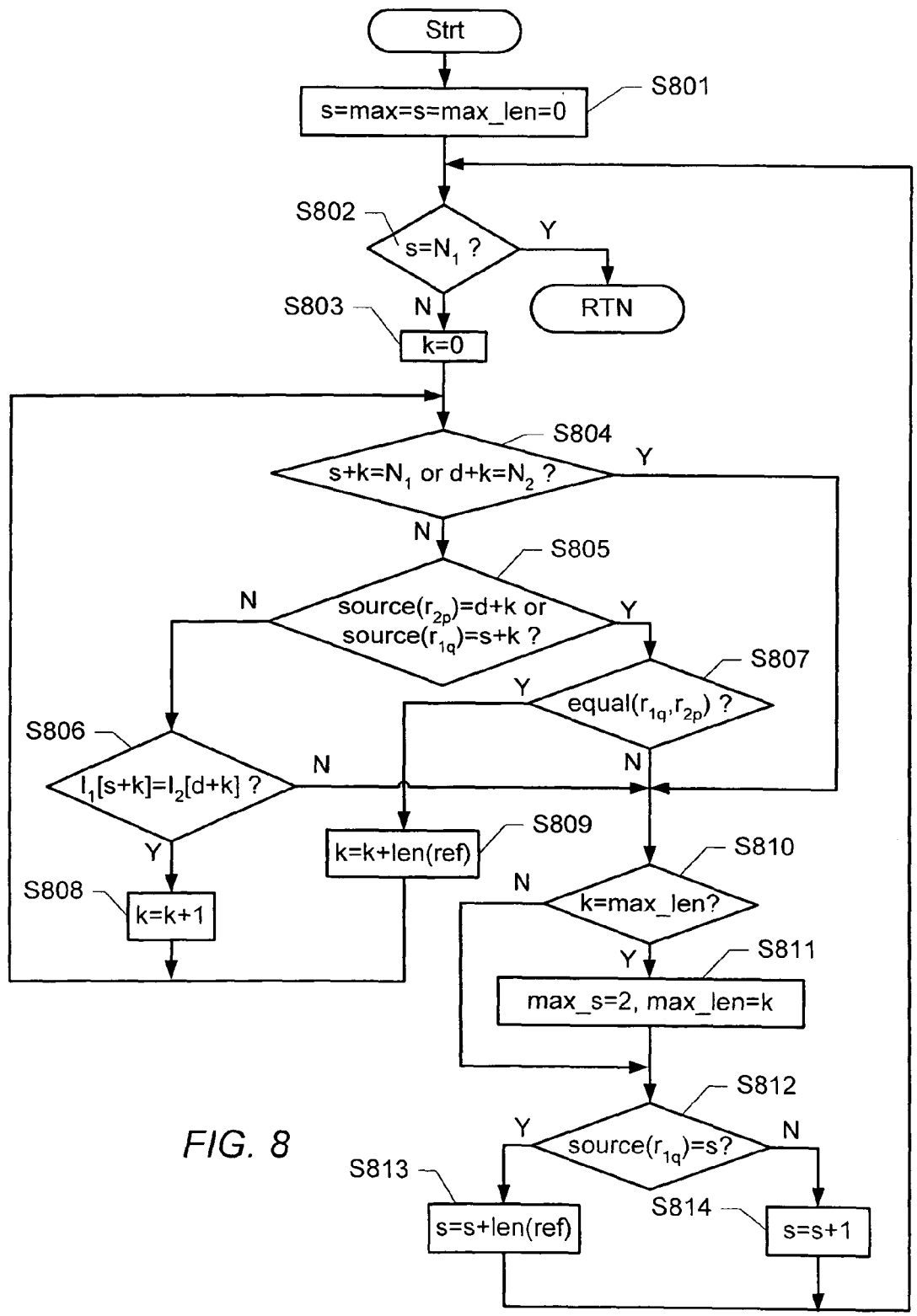
FIG. 8 shows a more detailed flow diagram of an example of the step of determining common substrings in the current and updated load modules.

FIG. 8 shows a more detailed flow diagram of an example of the step of determining common substrings in the current and updated load modules.

The process of FIG. 8 receives the following input: The entire installed (baseline) image $I_1[0:N_1-1]$, the suffix $I_2[d:N_2-1]$ of the new image, and the collection of relocation records, $R_1$ and $R_2$, respectively.

The process generates the following output: the position max_s of the substring in $I_1$ and its length max_len.

In initial step S801, the process initializes a pointer s into the baseline image $I_1$ to point to the start of the image, i.e. s=0, and it initialises the output values to zero: max_s=max_len=0.

The process then repeats the following steps (S802-S814) until the entire installed image ($I_1$) has been processed. Accordingly, in step S802 the process checks whether the entire image has been processed, i.e. whether s=$N_1$, where $N_1$ denotes the size of $I_1$. If s=$N_1$, the process returns (max_s, max_I) to the delta file generation process and terminates; otherwise the process proceeds at step S803.

In step S803, the process initialises the current length k of a common substring to k=0 and repeats steps S804-S809 until there is a mismatch (see below), until s+k=$N_1$ or until d+k=$N_2$.

Accordingly, in step S804, the process verifies whether the current common substring reaches the end of one of the images, i.e. s+k=$N_1$ or d+k=$N_2$. If this is the case the process proceeds at step S810; otherwise the process proceeds at step S805.

In step S805, the process checks whether there is a relocation record $r_{2p}$, such that source ($r_{2p}$)=d+k or a relocation record $r_{1q}$, such that source ($r_{1q}$)=s+k. If no such pair is found, the process determines that the memory content at the current address is "plain" binary content, i.e. no unresolved reference, and the process proceeds at step S806; otherwise, when a pair of references, $r_{1q}$ and $r_{2p}$, was found, the process checks whether equal ($r_{1q}$,$r_{2p}$) (step S807). If equal ($r_{1q}$,$r_{2p}$), the process advances k by the length of the matched reference (step S809); otherwise, there is a mismatch, and the process proceeds at step S810.

At step S806, i.e. when the process compares plain binary content, the process determines whether $I_1[s+k]$=$I_2[d+k]$. If this is the case, the process increments k by one (step S808); otherwise, the process has found a mismatch and proceeds at step S810.

In step S810, the process determines whether k>max_len, i.e. whether the longest prefix so far has been found. If yes, the process sets max_s=s, max_len=k (step S811).

Subsequently, in step S812, the process checks whether there is a relocation record $r_{1q}$, such that source ($r_{1q}$)=s, i.e. whether the pointer s currently points at a reference in the baseline image. If yes, the process advances s by the length of that reference (step S813); otherwise, the process advances s by 1 (step S814).

In the following, two alternative matching processes will be described based on efficient matching algorithms.

Figure 9:
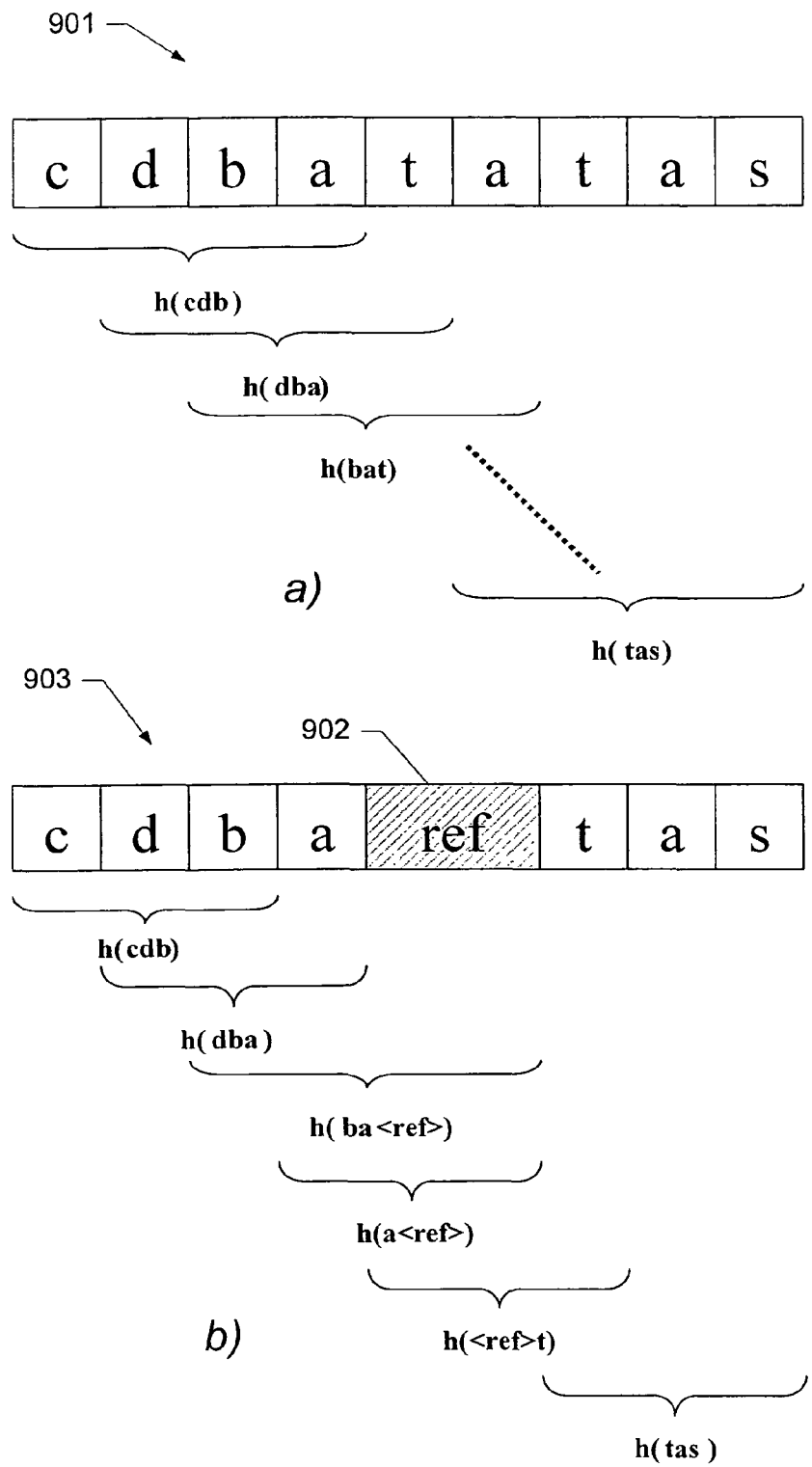
FIG. 9 illustrates another example of the step of determining common substrings in the current and updated load modules.

FIG. 9 illustrates another example of the step of determining common substrings in the current and updated load modules. The example of FIG. 9 is based on a method that utilises hash keys to efficiently identify common substrings of a fixed size (for instance 4 bytes). As disclosed in "Delta Storage for Arbitrary Non-Text Files" by Christoph Reichenberger, in Proceedings of the 3rd international workshop on Software configuration management, May 1991, pp 144-152, the search for substrings can be sped up using hash keys on substrings of a fixed length. Rather than considering every possible starting point s, as in steps S804-S809 of the method of FIG. 8, it is possible to restrict the search to starting points with identical hash keys. The longer the substrings that are used to compute the hash key, the better the separation of unequal prefixes and the fewer the starting points that need to be considered. However, the key length also limits the shortest substring that can be matched. Using key lengths that correspond to the shortest profitable copy instruction is one option.

In a pre-processing step, hash keys for all substrings of the given length in $I_1$ are computed. Each symbol in $I_1$ contributes to several hash keys, as is illustrated FIG. 9*a*. FIG. 9*a* illustrates a substring 901 that includes 9 symbols: "c", "d", "b", "a", "t", "a", "t", "a", and "s". There are seven substrings of length 3 in the string "cdbatatas". Each position of the string is a possible starting point for string matching. Hence, assuming for the purpose of the example of FIG. 9 a key length of 3, the matching process calculates 7 hash values: h(cdb), h(dba), h(bat), h(ata), h(tat), h(ata), h(tas).

FIG. 9*b* illustrates a generalization of this matching approach. In particular, FIG. 9*b* illustrates a string 903 'cdba<ref>tas', where <ref> is a special symbol 902 that replaces a particular reference. In this example <ref> is two positions wide. The unresolved reference 902 within the substring affects the value of the hash key. However, since it does not make sense to match a reference partially, the process does not compute hash keys for substrings that start in the middle of a reference. Therefore, in this example, the process sonly computes 6 hash values, as illustrated in FIG. 9*b*. To avoid substrings that end in the middle of a reference, the process extends such keys to include the entire reference, as illustrated by the hash value h(ba<ref>) in FIG. 9*b*.

Figure 10:
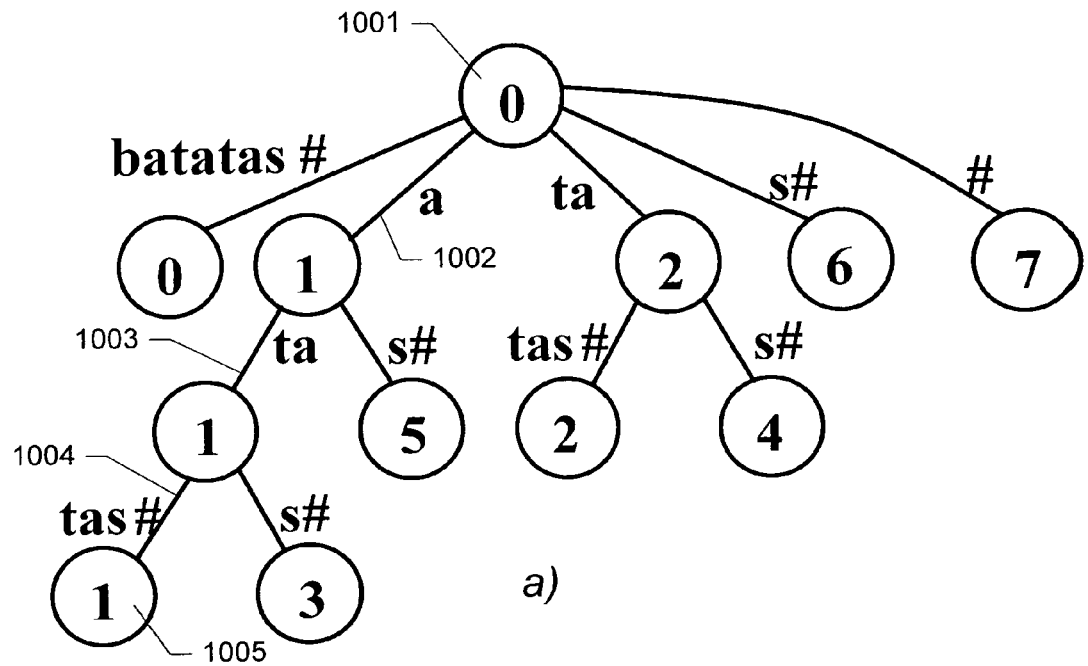
FIG. 10 illustrates yet another example of the step of determining common substrings in the current and updated load modules.
Figure 10:
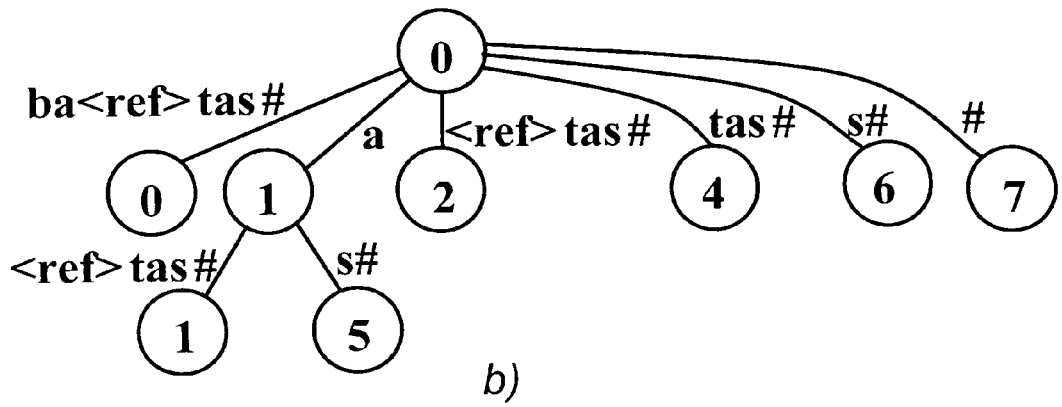

FIG. 10 illustrates yet another example of the step of determining common substrings in the current and updated load modules. In this example, the substring matching utilises an efficient algorithm based on suffix, disclosed in the article "The String-to-String Correction Problem with Block Moves" by Walter F. Tichy in ACM Transactions on Computer Systems 2:4 (November 1984), pp 309-321. FIG. 10*a* illustrates the suffix tree of the string 'bananas' (# is the unique end marker). The edges of the suffix tree are annotated by substrings of the string $I_1$ (in the example of FIG. 9*a* $I_1$='batatas'), and the nodes are labelled by possible starting points of substrings. Concatenating the strings of the paths from the root 1001 to the leaves results in all suffixes $I_1$[s:$N_1$-1]. The interior nodes correspond to substrings which have several possible continuations, whereas the leaves correspond to the case in which only one option remains. Common substrings of $I_1$[s: $N_1$-1] and $I_2$[d:$N_2$-1] are located by tracing the prefixes of $I_2$[d:$N_2$-1] from the root of the suffix tree until a mismatch is found or a leaf is reached. For example, when tracing the string 'atatd' the edges labelled 'a' (1002), 'ta' (1003) and 'tas#' (1004) are traversed. At the last edge 1004 there is a mismatch ('tas#'≠'td'). The trace ends at a node 1005 labelled 1, which is the starting point of the common substring 'atat'. Hence, the suffix tree of $I_1$ can be used to find the substrings very rapidly.

FIG. 10*b* illustrates a modification of the matching process that takes references into account. In particular, FIG. 10*b* illustrates the suffix tree of the string 'ba<ref>tas', where <ref> is a special symbol that replaces a particular reference. In this example <ref> is two positions wide. The node labels refer to the original starting positions before substitution of references. Atomicity of references can be achieved by extending the alphabet by symbols that uniquely represent each unresolved reference (equal references are represented by the same symbol). When constructing the suffix tree, the added symbols replace unresolved references. The same substitution is made in $I_2$ when tracing prefixes.

Hence, in the above, embodiments have been described of a method for incremental updates of load modules by means of parameterized delta files. It is an advantage of the methods described herein that it is not necessary to know the exact content of the installed image when the delta file is generated. The specification of certain values is deferred until the delta file is applied. The method can be used with existing techniques for delta generation and delta application. Existing techniques are extended to permit certain properties of the delta file to be parameterized.

It is noted that the above embodiments have mainly been described with reference to flash memory. However, it is understood that the method described herein may also be implemented in connection with other types of memory, including memory types that are writable in smaller units, e.g. byte-wise or even bitwise. Furthermore, the method described herein may also be applied in connection with other storage media, such as optical disks, hard disks, floppy disks, tapes, and/or other types of magnetic and/or optical storage media. For example, the method described herein may also be applied to the update of computers, such as desktop computers, which load programs from a secondary memory/storage medium into RAM before execution.

The invention can be implemented by means of hardware comprising several distinct elements, and by means of a suitably programmed computer. In the device claims enumerating several means, several of these means can be embodied by one and the same item of hardware, e.g. a suitably programmed microprocessor or computer, and/or one or more communications interfaces as described herein. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of generating a delta file, the delta file including update instructions for causing a target processing device to transform a current memory image module into an updated memory image module; the method comprising:
   incorporating a parametric representation of a first memory address in the delta file, the parametric representation being parametric with respect to at least the location of the current memory image module in memory space and the location of the updated memory image module in memory space; and
   incorporating parameter resolution instructions in the delta file,
   wherein the method includes a pre-processing step, a delta file generation step, and a post-processing step,
   wherein the pre-processing step includes:
   generating respective canonical representations of respective relocatable versions of the current and updated memory image modules, wherein symbolic references to memory addresses are replaced by predetermined memory content; and
   forwarding information about the replaced symbolic references to the post-processing step;
   wherein the delta file generation step includes generating a delta file from the canonical representations of the relocatable current and updated memory image modules; and
   wherein the post-processing step includes generating the parameter resolution instructions from the forwarded information about replaced symbolic references and from the generated delta file.

2. A method according to claim 1, wherein the parametric representation is further parametric with respect to each address value, external to the updated memory image module, referenced by the updated memory image module.

3. A method according to claim 1, wherein the parametric representation is parametric with respect to at least a start address of the current memory image module in memory space and a start address of the updated memory image module in memory space.

4. A method according to claim 1, comprising generating the delta file from relocatable versions of the current and updated memory image modules, the relocatable versions including symbolic references to memory addresses, and from current and updated relocation instructions for said symbolic references in the respective relocatable versions of the current and updated memory image modules.

5. A method according to claim 4, wherein generating the delta file further includes comparing the relocatable versions of the current and updated memory image modules so as to identify at least one common substring; and
   wherein comparing includes comparing the symbolic references by comparing said symbolic references and the corresponding resolution instructions.

6. A method according to claim 5, wherein comparing the symbolic references includes determining symbolic references to be equal only if said symbolic references are equal in the relocatable versions of the current and updated memory image modules and if the corresponding current and updated resolution instructions for said symbolic references are equal.

7. A method according to claim 5, further comprising, responsive to an identification of a common substring in the relocatable versions of the current and updated memory image modules:
   comparing respective sizes associated with an add instruction for causing the target processing device to add the identified common substring to the updated memory image module and a copy instruction for causing the target processing device to copy the identified common substring from the current memory image module to the updated memory image module, wherein comparing the respective sizes includes comparing the respective sizes of the add and copy instructions and of the respective parameter resolution instructions for symbolic references included in the common substring, if any, so as to determine a smallest size one of the respective sizes; and
   responsive to a result of the comparing, generating an add instruction or a copy instruction corresponding to the determined smallest size.

8. A method according to claim 4, wherein the relocatable versions of the current and updated memory image modules include program code in an object code format.

9. A method according to claim 1, wherein the current memory image module is stored in a storage medium associated with the target processing device.

10. A method according to claim 9, wherein the storage medium is a memory of a processing device.

11. A method according to claim 1, wherein the parameter resolution instructions are adapted to cause the target processing device to determine at least the location of the current memory image module in memory space and the location of the updated memory image module in memory space, and to determine an address value of the first memory address from the parametric representation and the determined value.

12. A method according to claim 1, further comprising performing a delta update of the current memory image module with the updated memory image module, the current memory image module being stored in a storage medium associated with a target processing device;
wherein performing the delta update comprises:
sending said generated delta file to the target processing device; and
transforming, responsive to the received update instructions and to the parameter resolution instructions, the current memory image module into the updated memory image module.

13. A method according to claim 12, further comprising storing the updated memory image module in a persistent memory.

14. A method according to claim 13, further comprising executing updated program code included in the updated memory image from the persistent memory.

15. A method according to claim 12, further comprising obtaining a location of the current memory image module in memory space and a location of the updated memory image module in memory space.

16. A method according to claim 15, further comprising obtaining a global symbol table, the global symbol table including at least one address value addressable by the updated memory image module, the address value being external to the updated memory image module.

17. A method according to claim 16, wherein the global symbol table includes at least one current address value within the current memory image module addressable by other memory image modules, and wherein the method comprises updating the current address value with a corresponding updated address value within the updated memory image module.

18. A method according to claim 17, further comprising updating, from said current address value to said updated address value, all references in other memory image modules which references refer to the current address value.

19. A method according to claim 12, further comprising providing a list of outgoing references for each memory image module, each list of outgoing references including a list of global symbols addressed from the corresponding memory image module and which global symbols are external to the memory image module.

20. A method according to claim 12, wherein transforming includes determining a value of at least the location of the current memory image module in memory space and the location of the updated memory image module in memory space, and determining an address value of the first memory address from the parametric representation and the determined value.

21. A method according to claim 1, wherein the updated memory image module includes at least one reference to the first memory address.

22. A method according to claim 1, wherein the method is used for the reprogramming of portable radio communications equipment.

23. A computer program product comprising program code means adapted to cause a data processing system to perform a method when said program code means are executed on the data processing system, the method being a method of generating a delta file, the delta file including update instructions for causing a target processing device to transform a current memory image module into an updated memory image module, the method comprising:
incorporating a parametric representation of a first memory address in the delta file, the parametric representation being parametric with respect to at least the location of the current memory image module in memory space and the location of the updated memory image module in memory space; and
incorporating parameter resolution instructions in the delta file,
wherein the method includes a pre-processing step, a delta file generation step, and a post-processing step,
wherein the pre-processing step includes:
generating respective canonical representations of respective relocatable versions of the current and updated memory image modules, wherein symbolic references to memory addresses are replaced by predetermined memory content; and
forwarding information about the replaced symbolic references to the post-processing step;
wherein the delta file generation step includes generating a delta file from the canonical representations of the relocatable current and updated memory image modules; and
wherein the post-processing step includes generating the parameter resolution instructions from the forwarded information about replaced symbolic references and from the generated delta file.

24. A system for generating a delta file, the delta file including update instructions for causing a target processing device to transform a current memory image module into an updated memory image module; the system comprising:
storage means for storing a representation of a current software version corresponding to the current memory image module;
processing means adapted to generate a delta file by performing the steps of a method of generating a delta file, the delta file including update instructions for causing a target processing device to transform a current memory image module into an updated memory image module, the method comprising:
incorporating a parametric representation of a first memory address in the delta file, the parametric representation being parametric with respect to at least the location of the current memory image module in memory space and the location of the updated memory image module in memory space; and
incorporating parameter resolution instructions in the delta file,
wherein the method includes a pre-processing step, a delta file generation step, and a post-processing step,
wherein the pre-processing step includes:
generating respective canonical representations of respective relocatable versions of the current and updated memory image modules, wherein symbolic references to memory addresses are replaced by predetermined memory content; and
forwarding information about the replaced symbolic references to the post-processing step;
wherein the delta file generation step includes generating a delta file from the canonical representations of the relocatable current and updated memory image modules; and
wherein the post-processing step includes generating the parameter resolution instructions from the forwarded information about replaced symbolic references and from the generated delta file.

25. A system according to claim 24 further comprising communications means adapted to send the generated delta file to the processing device.

* * * * *

UNITED STATES PATENT AND TRADEMARK OFFICE
CERTIFICATE OF CORRECTION

PATENT NO. : 8,296,535 B2  Page 1 of 1
APPLICATION NO. : 12/096358
DATED : October 23, 2012
INVENTOR(S) : Eker et al.

It is certified that error appears in the above-identified patent and that said Letters Patent is hereby corrected as shown below:

In the Drawings:

In Fig. 9(a), Sheet 5 of 6, delete "h( cdb)" and insert -- h(cdb) --, therefor.

In Fig. 9(a), Sheet 5 of 6, delete "h( dba)" and insert -- h(dba) --, therefor.

In Fig. 9(a), Sheet 5 of 6, delete "h( tas)" and insert -- h(tas) --, therefor.

In Fig. 9(b), Sheet 5 of 6, delete "h( cdb)" and insert -- h(cdb) --, therefor.

In Fig. 9(b), Sheet 5 of 6, delete "h( dba)" and insert -- h(dba) --, therefor.

In Fig. 9(b), Sheet 5 of 6, delete "h( ba<ref>)" and insert -- h(ba<ref>) --, therefor.

In Fig. 9(b), Sheet 5 of 6, delete "h( tas)" and insert -- h(tas) --, therefor.

In the Specifications:

In Column 1, Line 3,
insert -- CROSS-REFERENCE TO RELATED APPLICATIONS
This application claims priority under 35 U.S.C. § 119 to European Patent Application No. 05388112.4, filed December 20, 2005, which is hereby incorporated herein by reference in its entirety. This application also claims the benefit of U.S. Provisional Application No. 60/752,040, filed December 21, 2005, which is hereby incorporated herein by reference in its entirety. --.

Signed and Sealed this
Fourteenth Day of May, 2013

Teresa Stanek Rea
*Acting Director of the United States Patent and Trademark Office*